United States Patent Office 2,811,541
Patented Oct. 29, 1957

2,811,541
POLYMERIZATION OF VINYLDIHYDROCARBYL-SILANES AND PRODUCTS THEREOF

James W. Curry, Midland, Mich., assignor to Dow Corning Corporation, Midland, Mich., a corporation of Michigan No Drawing. Application June 20, 1955,
Serial No. 516,752

6 Claims. (Cl. 260—448.2)

The application relates to a novel method of polymerizing vinylsilanes and to the novel products obtained thereby.

The polymerization of vinylsilanes via additional polymerization involving the vinyl groups is well known. Heretofore vinylsilanes have been polymerized, via vinyl addition, by heating them under pressure preferably in the presence of free radical generators such as organic peroxides. Under such conditions polymerization occurs giving polymers with silicon atoms attached along the carbon chain. The heretofore known methods, however, do not permit polymerization to be carried out in the presence of silicon bonded hydrogen without addition of the silicon and hydrogen to the double bond of the vinyl group. When this addition occurs, one obtains silalkylene compounds of the type more fully described in the applicant's copending application Serial No. 516,751 filed concurrently herewith.

It is the object of the present invention to provide a method for carrying out polymerization of vinylsilanes which also contain silicon bonded hydrogen without appreciably affecting the silane hydrogen. Another object is to provide novel organosilicon polymers which are capable of further cross linking by reaction of the silane hydrogen. Other objects and advantages will be apparent from the following description.

In accordance with this invention silanes of the formula $CH_2=CHSiR_2H$ are polymerized by heating them in the presence of alkali metal alkoxides under anhydrous conditions whereby a polymer of the unit formula $$\left[ \begin{array}{c} -CH_2CH- \\ | \\ R_2SiH \end{array} \right]_n$$

is obtained. In these compounds R is any monovalent hydrocarbon radical free of aliphatic unsaturation.

In carrying out the process of this invention the silane and the alkali metal alkoxides are heated under anhydrous conditions. It is essential that the conditions be anhydrous, otherwise the alkali metal will attack the silane hydrogen and give undesirable by-products. The reaction is best carried out at a temperature of 100° C. or above, preferably from 100 to 150° C. The pressure is not critical and can be either atmospheric, subatmospheric or superatmospheric. Inert solvents such as aromatic or aliphatic hydrocarbons or dialkylethers may be employed if desired.

The amount of catalyst relative to the amount of silane is not critical although preferably the catalyst should be kept as low as possible in order to minimize the possibility of reaction of the alkali with the silane hydrogen. A suitable catalyst range is 1 mol of alkali metal alkoxide per 40 mols of silane.

For the purpose of this invention the R groups can be any monovalent hydrocarbon radical free of aliphatic unsaturation such as alkyl radicals such as methyl, ethyl, isopropyl and octadecyl; cycloalkyl radicals such as cyclohexyl and cyclopentyl; aryl hydrocarbon radicals such as phenyl, xenyl, naphthyl and tolyl and alkaryl hydrocarbon radicals such as benzyl.

Any alkali metal alkoxide can be employed as the catalyst in this invention. Suitable alkoxides are sodium ethoxide, potassium isopropoxide, lithium butoxide and cesium hexoxide. Preferably the alkoxide should contain less than 6 carbon atoms.

The polymers obtained by the method of this invention are reactive materials which may range from thin fluids to solids depending upon the degree of polymerization and the nature of the R groups attached to the silicon. These polymers are useful as electrical insulation and as coating compositions. They may be thermoset by reacting the silane hydrogen with reagents which will cross link the molecules such as, for example, by heating a mixture of the polymer and a platinum catalyst in the presence of a divinylsilane to give the reaction

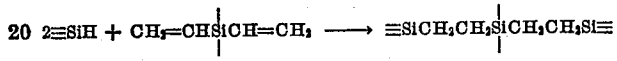

Alternatively the materials may be set by adding to the polymer an alkaline material such as quaternary ammonium hydroxides, amines and the like in the presence of water or other hydroxylated materials. This will cause cross linking of the polymers via the silicon atoms by removal of the hydrogen and formation of the siloxane linkages.

The following examples are illustrative only and should not be construed as limiting the invention which is properly delineated in the appended claims.

Example 1

10 g. of diethylvinylsilane was added to dry sodium methoxide in amount to give 40 mols of silane per 1 mol of methoxide. The mixture was heated under reflux for 72 hours. The crude reaction mixture was then distilled and there was obtained a dark, amber liquid residue which was shown by analysis and by molecular weight determination to contain approximately 24 units of the formula

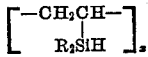

The infrared spectrum of the polymer showed approximately the same amount of SiH as the original silane. It further showed no C=C absorption.

Example 2

Equivalent results are obtained when 40 mols of the following silanes are each refluxed with 1 mol of isopropoxide in accordance with the method of Example 1. In each case polymers having the following unit formulas were obtained.

| Silane | Unit formula of polymer |
|---|---|
| Diphenylvinylsilane | —CH₂CH—<br>SiHPh₂ |
| Phenylmethylvinylsilane | —CH₂CH—<br>SiHPhMe |
| Dimethylvinylsilane [1] | —CH₂CH—<br>SiHMe₂ |
| Cyclohexylmethylvinylsilane |  |

[1] Heated under pressure.

That which is claimed is:

1. A method of polymerizing vinylsilanes which comprises heating a vinylsilane of the formula $$CH_2=CHSiH\overset{R_2}{}$$

in the presence of an alkali metal alkoxide under anhydrous conditions whereby a polymer of the unit formula $$-CH_2CH-\\ \phantom{xxx}|\\ \phantom{xxx}R_2SiH$$

is obtained, in said compounds R being a monovalent hydrocarbon radical free of aliphatic unsaturation.

2. A polymer of the unit formula $$-CH_2CH-\\ \phantom{xxx}|\\ \phantom{xxx}R_2SiH$$

in which R is a monovalent hydrocarbon radical free of aliphatic unsaturation.

3. A composition in accordance with claim 2 wherein both R's are phenyl.

4. A composition in accordance with claim 2 wherein both R's are methyl.

5. A composition in accordance with claim 2 wherein 1 R is methyl and the other is phenyl.

6. A composition in accordance with claim 2 wherein both R's are ethyl.

References Cited in the file of this patent
UNITED STATES PATENTS 2,721,873    MacKenzie et al. _____ Oct. 25, 1955

OTHER REFERENCES

Hurd: J. Amer. Chem. Soc., volume 67, October 1945, pages 1813–1814.